US008334617B2

(12) United States Patent
Vega Betoret et al.

(10) Patent No.: US 8,334,617 B2
(45) Date of Patent: Dec. 18, 2012

(54) SYSTEM AND METHOD FOR ENERGY OPTIMIZATION IN PHOTOVOLTAIC GENERATORS

(75) Inventors: Alejandro Vega Betoret, Madrid (ES); Alfredo Diez-Hochleitner Ruiz, Madrid (ES); Oscar Sanz Landivar, Madrid (ES); Jose Alfonso Almansa Leandrez, Madrid (ES)

(73) Assignee: Asea Brown Boveri, S.A., Madrid (ES)

( * ) Notice: Subject to any disclaimer, the term of this patent is extended or adjusted under 35 U.S.C. 154(b) by 662 days.

(21) Appl. No.: 12/495,908

(22) Filed: Jul. 1, 2009

(65) Prior Publication Data

US 2010/0109442 A1    May 6, 2010

(30) Foreign Application Priority Data

Oct. 30, 2008  (ES) .................................. 200803165

(51) Int. Cl.
*H02J 1/00*        (2006.01)
(52) U.S. Cl. ........................................... 307/80; 307/82
(58) Field of Classification Search .................... 307/80, 307/82
See application file for complete search history.

(56) References Cited

U.S. PATENT DOCUMENTS

| | | | |
|---|---|---|---|
| 5,500,052 A | 3/1996 | Horiuchi et al. | |
| 6,285,572 B1 | 9/2001 | Onizuka et al. | |
| 6,448,489 B2 | 9/2002 | Kimura et al. | |
| 6,800,964 B2 * | 10/2004 | Beck | 307/126 |
| 7,110,273 B2 | 9/2006 | Abe et al. | |
| 7,555,665 B2 | 6/2009 | Belson et al. | |
| 2008/0078436 A1 | 4/2008 | Nachamkin et al. | |
| 2009/0183405 A1 * | 7/2009 | Wilkes | 40/543 |

FOREIGN PATENT DOCUMENTS

| | | |
|---|---|---|
| ES | 2284577 T3 | 11/2007 |
| JP | 2002073184 | 3/2002 |

OTHER PUBLICATIONS

International Preliminary Report on Patentability dated May 3, 2011 for Application No. PCT/ES2009/000190.
International Search Report dated Aug. 3, 2009 for Application No. PCT/ES2009/000190.
English Translation of Abstract for JP2002073184, Mar. 12, 2003.
English Translation of Abstract for ES2284577T3, Nov. 16, 2007.

* cited by examiner

*Primary Examiner* — Rexford Barnie
*Assistant Examiner* — Dru Parries
(74) *Attorney, Agent, or Firm* — Frost Brown Todd LLC

(57) ABSTRACT

An exemplary system for energy optimization in photovoltaic generators comprises a plurality of primary photovoltaic generators, a plurality of secondary photovoltaic generators, and a plurality of inverters. The secondary photovoltaic generators each comprise a plurality of photovoltaic generator blocks. The inverters are configured to convert direct voltage/current into alternating voltage/current. A first switching system is operable to selectively couple outputs of the primary generators with inputs of the inverters. A second switching system is operable to selectively couple outputs of the generator blocks with the outputs of the secondary generators. A control system is operable to automatically control the first switching system and the second switching system. An exemplary method comprises operating the control system to automatically control the two switching systems to optimize power provided to the inverters. The control system is responsive to data that includes detected and calculated operational, environmental, and historical data.

19 Claims, 3 Drawing Sheets

SYSTEM AND METHOD FOR ENERGY OPTIMIZATION IN PHOTOVOLTAIC GENERATORS

PRIORITY

This application claims priority from the disclosure of Spanish Patent Application Serial No. ES200803165, entitled "System and Method for Energy Optimization in Photovoltaic Generators," filed Oct. 30, 2008, the disclosure of which is incorporated by reference herein in its entirety.

FIELD OF THE INVENTION

Examples of the present invention relate to a system and method for energy optimization in photovoltaic generators, and in particular to a system and method based on the switching of different photovoltaic generators with respect to a series of inverters with the aim of optimizing inverter performance.

BACKGROUND

Some photovoltaic installations may include a plurality of photovoltaic generators with their outputs connected to respective inverters to convert the generated energy into alternating current and, for example, to supply it synchronously to the electricity network. Depending on the time of day, geographical location, date, weather, etc., the incidence of sun on the panels of these photovoltaic generators may be low or very low, so that the efficiency of performance of the inverters may also be low. In some cases, the direct energy supplied by the generators (either current or voltage) may be below the minimum value acceptable by the inverter for it to start functioning. For this reason, the state of the art has proposed various alternatives for the energy optimization of photovoltaic generators, such as those based on switching of said generators to corresponding inverters, or based on the inclusion of additional, non-photovoltaic generators, with the aim of assuring energy supply.

U.S. Pub. No. 2008/0078436 discloses a system including arrays of solar panels, each one connected to a respective inverter. In order to guarantee energy supply when that coming from the solar panels is insufficient, the system includes an additional generator, in principle connected only to an additional inverter to collaborate in energy production. When the energy generated by the solar panels is very low or non-existent (at night for example), the additional generator connects to the inputs of the other inverters and increases their performance in a controlled way to substitute the panels in the generation of energy. The switching can be manual or automatic (for example, the system can be programmed to connect during the hours when the solar energy is very low). Said additional generator is "bio-friendly," such as one which comprises a motor using biodiesel fuel. This application does not propose selectively connecting the additional generator to only some of the inverters that are connected to the solar panels or leaving the additional generator disconnected from its respective inverter when the solar panels are supplying sufficient energy.

JP2002073184 proposes a system for the generation of photovoltaic energy even when solar radiation is low. For that purpose the system, which comprises a plurality of rows of solar panels, each of which is connected in principle to a respective inverter, has switching units which, in their most simple operation, disconnect one of the rows of panels from an inverter (when the output energy is below the minimum requirements of the inverter) and connect it to another of the inverters. In other embodiments, the system includes a control unit which monitors the outputs of the inverters and makes predictions regarding said outputs, with the aim of reconnecting the disconnected inverter to its row of panels when this would be efficient.

In ES2284577T3 an installation comprising photovoltaic generators is proposed that, for an embodiment, are formed from photovoltaic modules connected in series for the supply of alternating energy after corresponding conversion by inverters. The installation includes a plurality of switching devices activated by a control device to initiate a switching action that causes the separation of at least one generator from a first inverter and a connection of this generator to a second inverter when a condition occurs in which the input power to the second inverter drops to such a low level that it no longer works in its optimum efficiency zone. The installation includes various generators and various inverters and the control device for the switching devices for disconnecting and connecting them according to the condition described.

Both JP2002073184 and ES2284577T3 propose disconnecting one or more photovoltaic generators from a first inverter to connecting them to a second inverter, either because the first inverter is working poorly or not at all efficiently (JP2002073184) or because the second inverter is working below its zone of optimum efficiency (ES2284577T3).

In none of these references is it proposed to provide additional photovoltaic generators, not previously connected to another inverter, for their selective and discrete connection to an inverter that can handle more input power than that being supplied by the photovoltaic generator to which it is connected, with the aim of complementing the supply of energy of said generator when it may be necessary or otherwise desired.

SUMMARY

It may be desirable in some settings to provide a system which enables energy optimization in photovoltaic generators, and specifically, the optimization of the efficiency of the inverters used, supplying them with a base or main power generated by a main photovoltaic generator and, when necessary or otherwise desired, to supply additional power, also of photovoltaic origin, selectively variable in order to make fine adjustments to complement (not substitute) the main power.

Some versions of the present invention include a system for energy optimization in photovoltaic generators that comprises: a plurality of photovoltaic generators, each of which comprises an assembly of photovoltaic panels of a first type; a plurality of inverters intended to convert direct voltage/current into alternating voltage/current; first switching means arranged between the outputs of at least some of the photovoltaic generators and the inputs of the inverters; and control means intended to automatically control said switching means to selectively connect/disconnect the outputs of said photovoltaic generators to the inputs of said inverters. In some versions, each of the photovoltaic generators is provided as a main generator. Furthermore, some versions may also comprise: a plurality of additional photovoltaic generators, each of which is composed of photovoltaic generator blocks comprising respective assemblies of photovoltaic panels of a second type; and second switching means arranged between the outputs of the photovoltaic generator blocks and the outputs of said additional photovoltaic generators in order to apply one or more of the photovoltaic generator blocks to said outputs of the additional photovoltaic generators.

The control means of the system in some versions is provided to automatically control also the second switching means, for selectively connecting/disconnecting one or more of said photovoltaic generator blocks with respect to the output of the additional photovoltaic generator to which they belong and in relation to the inputs of the inverters, with the aim of supplying additional power to them, which is a function of the number of connected blocks and less than that supplied by the main photovoltaic generators. By way of example only, the control means may comprise one or more processing systems intended for carrying out the control of the switching means depending on the values of operational parameters of the energy optimization system and/or of the assemblies of photovoltaic panels, with such values being detected and/or measured and/or calculated depending on the particular system.

Regarding the detected operational parameters, the system may include a series of sensors that are disposed in different elements of the system and that are intended to detect the values of different operational parameters, with the outputs of these sensors being connected to the inputs of the processing system(s) to supply it with the values of the detected operational parameters through appropriate electric/electronic circuitry. The processing system may have access to historical data regarding operational parameters of the system, and may also be configured to carry out control of the switching means according also to said historical data.

Some versions of the invention may also relate to a method for energy optimization of photovoltaic generators that comprises connecting/disconnecting, selectively and automatically, the outputs of a plurality of photovoltaic generators, each photovoltaic generator being formed by a respective assembly of photovoltaic panels, to the inputs of a plurality of inverters being intended to convert direct voltage/current into alternating voltage/current. The method may also comprise carrying out said selective connection for at least one specific inverter (or a plurality of inverters in a similar way), by means of carrying out the following steps sequentially or in some other suitable arrangement: connecting the output of at least one main photovoltaic generator, formed by an assembly of photovoltaic panels of a first type, to the input of a specific inverter, to supply it with a base or main power; and further connecting to the input of said specific inverter, at least one additional photovoltaic generator, to supply it with additional power, without reaching the maximum input power of each inverter, representing a fine adjustment, complementary to the main power provided by the main photovoltaic generator.

By way of example only, and with the aim that the additional power is variable depending on the needs of the inverter to which it supplies said additional power as part of said fine adjustment, each one of said additional photovoltaic generators may comprise photovoltaic generator blocks comprising respective assemblies of photovoltaic panels of a second type, and said step of fine adjustment may comprise selectively and automatically connecting/disconnecting one or more of said photovoltaic generator blocks, by their outputs, to the output of the additional photovoltaic generator to which they belong to supply said output power to the same inverter with which the main photovoltaic generator is coupled, with a value depending on the number of connected generator blocks.

In some other versions, the variation of the output power of each additional photovoltaic generator is carried out not by including said blocks, but by instead using, for example, a regulatory device to manually or automatically, regulate said output power.

Regarding the selective disconnection mentioned above, some versions of the method comprise carrying it out, for said or another specific inverter, by disconnecting from the output of said additional photovoltaic generator one or more of said additional photovoltaic generator blocks, with the aim of slightly reducing the additional power supplied; and if necessary or otherwise desired, disconnecting from the input of a specific inverter at least the output of the main photovoltaic generator, with the aim of not supplying it any main power, after having previously also removed the additional power.

As will be described in greater detail below, different generators and blocks may be connected and disconnected with each other (and with an inverter with which a main photovoltaic generator is coupled) in different ways, such as based on different working situations. By way of example only, and with the aim of supplying more or less power to each inverter in order to keep it functioning within its tolerances and at the point of maximum efficiency, some versions of the method comprise carrying out this selective connection/disconnection depending on some or all of the following values, among other possible values: values of operational parameters of the system that include said photovoltaic generators and/or of the assemblies of photovoltaic panels and/or of any of the elements used by the energy optimization method, said values being detected and/or measured and/or calculated; and/or of real historical data regarding operational parameters of the system; and/or of technical data referring to forecasts of functioning and/or environmental conditions.

Suitable operational parameters that may be factored into the acts of connection/disconnection described herein may include, but are not limited to, at least one the following: temperature, of the photovoltaic generator plant and/or of each panel assembly; instantaneous irradiation; wind speed; dirt on the panels; losses in cables; voltages; currents and power levels of each inverter, of the plant, of each photovoltaic generator; or a combination thereof. Whenever possible, it may be desirable in some settings to use all of these operational parameters, whether they be detected via sensors (for example wind speed, instantaneous irradiation, etc.), measured (for example voltages and currents), or calculated (for example powers, estimated losses, etc.).

Suitable historical data that may be factored into the acts of connection/disconnection described herein may include, but need not be limited to, at least one of the following: annual irradiation curves to a resolution of a minute; annual hourly average temperatures and maximal efficiency curves of each inverter; or a combination thereof.

By further way of example only, and with the aim of carrying out said selective connection/disconnection automatically, some versions of the method comprise pre-establishing a series of theoretical set points relating theoretical power to be supplied, obtained from a specific number of main and additional photovoltaic generators, and of additional generator blocks, to connect to each inverter according to at least theoretical data of radiation predicted for the area where the photovoltaic generator plant is installed and of real historical data previously measured. For instance, the method may comprise pre-establishing these theoretical set points according to the detected and/or measured and/or calculated operational parameters previously described. These theoretical set points may be classified into a series of situations or cases that may include any of the following situations, these having been established from said theoretical data, historical data and/or operational parameters or otherwise: dawn; twilight; cloud cover; wind or snow; morning mist; low radiation; and maintenance tasks.

Versions of the method may further comprise detecting the real approximation to one of said set points or situational cases and connecting the generators associated with said set point to each inverter, with the aim of supplying it with power, the theoretical value of which is given by said set point.

Thus, if, for example, the method detects or determines by theoretical, historical and/or any of the operational parameter data that, in the geographical zone where the photovoltaic generators are located, twilight is approaching, the method may include connecting the generators associated with the set point of the "twilight" situational case for each inverter. In general for this "twilight" situation, where the energy generated is relatively low, this may involve connecting the highest possible number of photovoltaic generators, including additional photovoltaic generators, to each inverter. In addition or in the alternative, if the energy supplied to each inverter is still too low, some of the inverters may be disconnected and their photovoltaic generators may be connected to the remaining inverters to increase the power supplied to the remaining inverters.

The set points, which may establish which selection of connections/disconnections to carry out for each situational case, are theoretical, so that the estimation of power to supply following the pre-established selections can be erroneous or not fully appropriate for the real situation. The method of the present example may thus further comprise compensating for the differences between the real power supplied to each inverter and the theoretical power related to the applied set point, by the connection/disconnection of one or more photovoltaic generator blocks, that is performing fine adjustment of the supplied power, and to the extent that the differences are very large, it may also be possible to connect/disconnect the main generators.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings. In the drawings, like numerals represent like elements throughout the several views.

DETAILED DESCRIPTION

The following description of certain examples should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

Figure 1:
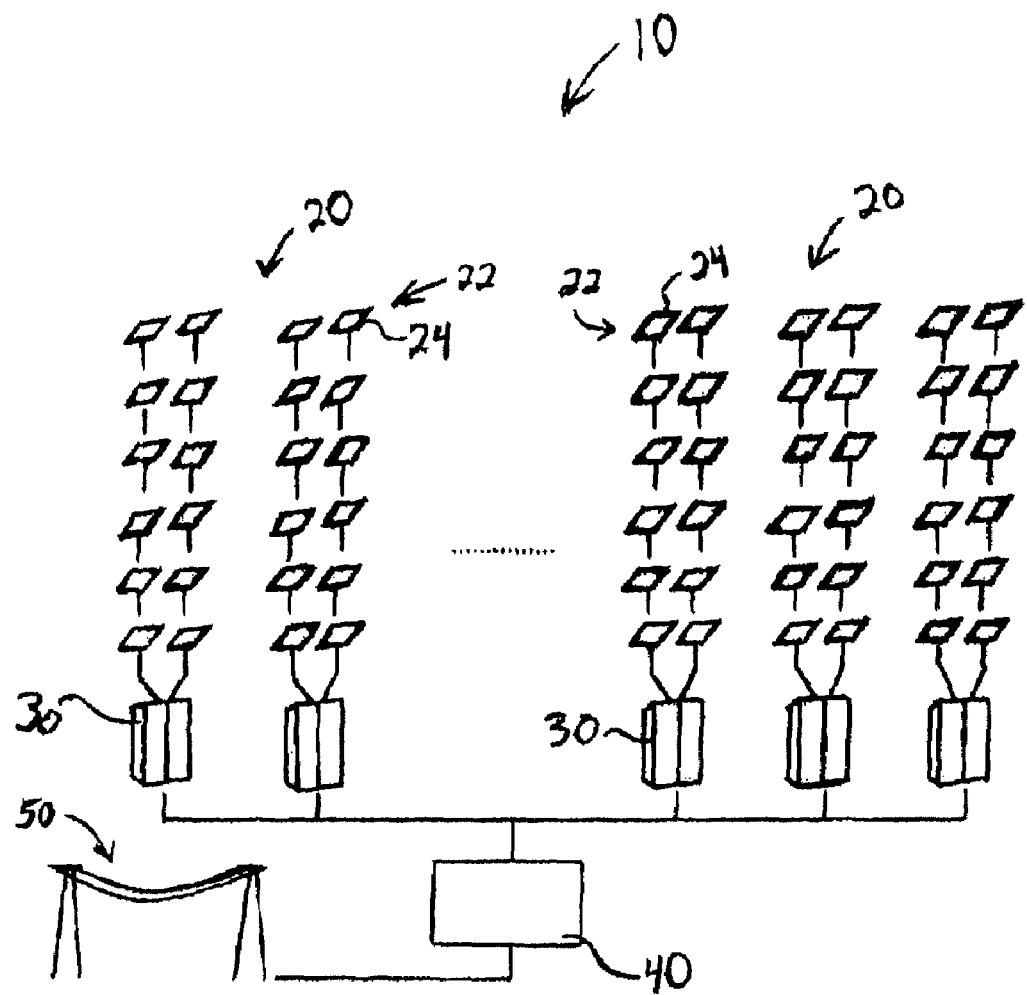
FIG. 1 is a schematic representation of a plant or conventional photovoltaic installation, connected to the electricity network.

Firstly, referring to FIG. 1, the basic elements included in a conventional photovoltaic plant (10) or installation can be seen. These elements include a photovoltaic field (20), inverters (30), and protections (40). The photovoltaic field (22) in this example includes a series of photovoltaic generators (22), each of which in turn comprises the interconnection in series and parallel of a specific number of photovoltaic modules (24) for capturing sunlight and transforming it into electrical energy, generating a direct current proportional to the received solar irradiation, and which are installed on solar trackers or structures. The inverters (30) in this example comprise electronic devices, based on power electronics, that convert direct energy (current/voltage) into alternating energy (current/voltage) with characteristics that are suitable for adding to the electricity network, in order to allow the photovoltaic installation (10) to operate in parallel with the electricity network (50). The protections (40) in this example comprise a configuration of elements that act as a connection interface between the photovoltaic installation (10) and the electricity network (50) for safety reasons, both for people and for the components comprising the photovoltaic installation (10).

Figure 2:
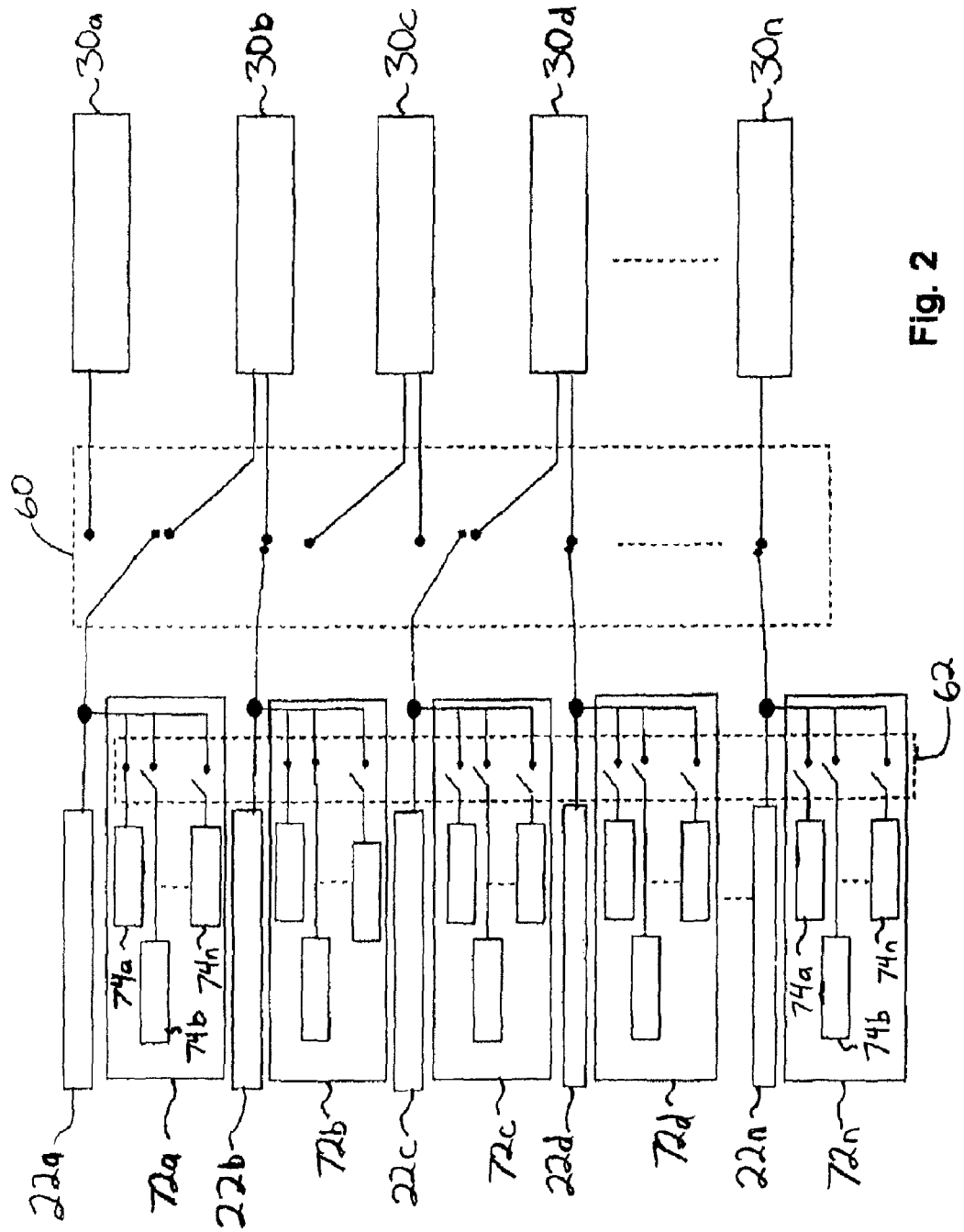
FIG. 2 shows schematically in detail the various elements of an exemplary system, including various generator blocks included within each additional photovoltaic generator.

The optimization system of the present example is illustrated in detail in FIG. 2. In this figure it can be seen that the main photovoltaic generators (22a through 22n) can be connected, through first switching means (60), to different inverters (30a through 30n), in a way that is already known. In the case illustrated, each main generator (22a through 22n) can be connected to one of two inverters (30a through 30n)—the first generator (22a) to the first or second inverter (30a or 30b), the second generator (22b) to the second or third inverter (30b or 30c), and so on. While five generators (22a through 22n) and five inverters (30a through 30n) are shown, it should be understood that any other suitable number of generators (22a through 22n) and inverters (30a through 30n) may be used. Similarly, while switching means (60) is shown as selectively coupling each generator (22a through 22n) with a selected one of two inverters (30a through 30n), it should be understood that switching means (60) may also be configured to selectively couple each generator (22a through 22n) with any other suitable number of inverters (30a through 30n).

In FIG. 2, several additional photovoltaic generators (72a through 72n) are also illustrated, each of which includes a plurality of photovoltaic generator blocks (74a through 74n), with n, in general, corresponding to the number of total inverters (30a through 30n). In other words, each additional photovoltaic generator (72a through 72n) has the same number of photovoltaic generator blocks (74a through 74n) as the number of inverters (30a through 30n) in this example. Alternatively, the number of photovoltaic generator blocks (74a through 74n) in each additional photovoltaic generator (72a through 72n) may have any other suitable relationship with the number of inverters (30a through 30n), or no apparent relationship.

In FIG. 2, a second switching means (62) can be seen arranged between the outputs of the photovoltaic generator blocks (74a through 74n) and the outputs of the additional photovoltaic generators (72a through 72n). Specifically, in the example illustrated in FIG. 2, in the first additional generator (72a), only the output of the first generator block (74a) is connected to the output of the additional generator (72a). In the second additional generator (72b), the outputs of the first two blocks (74a and 74b) are connected to the output of the generator (72b); and in the remaining additional generators (72c through 72n), no block (74a through 74n) is connected.

In general, the number of generator blocks (74a through 74n) may be determined according to the characteristics of each photovoltaic plant (10), including but not limited to the following characteristics: real performance ratio of the plant (10); average temperature; estimated irradiation; installation type (e.g., fixed, 1 axis, or 2 axes, etc.); and/or type and power of the inverters (30a through 30n). Alternatively, any other factors may influence the number of generator blocks (74a through 74n), in addition to or in lieu of any of those listed above.

The control means (80) controlling these switching means (60 and 62) are not illustrated in FIG. 2, but are illustrated separately in FIG. 3 for an example, and are discussed in greater detail below.

Continuing with FIG. 2, it can be seen how the output of each of the additional photovoltaic generators (72a through 72n) is connected to the output of one respective main photovoltaic generator (22a through 22n), so that on activating the first switching means (60) to connect, for example, the first main generator (22a), the connection of the first additional generator (72a) will also be made to the same inverter (30a or 30b) to which the main generator (22a) is connected—in this case (FIG. 2) with the second inverter (30b).

In some other versions, not illustrated, it is considered to connect the output of the additional generators (72a through 72n) to the inverters (30a through 30n) through other switching means, for example third switching means acting independently of the first—witching means (60). Other suitable ways in which the outputs of the additional generators (72a through 72n) may be selectively coupled with any desired inverters (30a through 30n) will be apparent to those of ordinary skill in the art in view of the teachings herein.

Although both the first switching means (60) and the second switching means (62) have been represented grouped by rectangles with broken lines encompassing all the switches included in them, each of said switches may controlled individually and independently by the control means (80).

In some versions, each of the photovoltaic generator blocks (74a through 74n) is adapted to supply approximately between 0.1% and 10% of the maximum power acceptable to each inverter (30a through 30n) (taking into account the tolerances) once the corresponding system losses (temperature, cabling, reflection, shadows, orientation, inclination, dirt, etc.) have been applied. Also in some versions, each of the main generators (22a through 22n) is intended to supply a maximum output power under conditions of maximum radiation of less than or equal to approximately 95%-100% of the maximum power acceptable to each inverter (30a through 30n) (taking into account the tolerances), once the corresponding losses to the system (temperature, cabling, reflection, shadows, orientation, inclination, dirt, etc.) have been applied. Alternatively, any other suitable power levels may be provided by generator blocks (74a through 74n) or main generators (22a through 22n).

In some settings (e.g., without an optimization system), main generators (22) may be designed with a power that is higher than the nominal power of the inverter (30) (e.g., 116 kW for an inverter of 100 kW). These extra 16 kW may be estimated to compensate for losses that may occur in the generator (22) due to dirt in the modules (24), cabling, bad orientation of the modules (24), shadows and reflection. So, the specified power of each solar module (24) (e.g., a module of 175 W) is the power under optimal conditions of incident irradiation and, consequently, the power calculated for an inverter (30) may depend on the incident irradiation (e.g., the irradiation can reduce due to cloud cover, etc.). That is, if, for example, the inverters (30a through 30n) accept a maximum input power of 100 kW and each of them is connected to a main generator (22a through 22n) of 116 kW (100 kW+16 kW estimated for losses), only in the summer months (June, July, August) and for a few hours will the main generator (22a through 22n) supply the 100 kW to the inverter (30a through 30n). By contrast, in winter, the power supplied by the main generator (22a through 22n) to the inverter (30a through 30n) may be, for example, about 80 kW for a few hours. Over the remainder of the hours, the power supplied by the generator (22a through 22n) to the inverter (30a through 30n) may be less.

By means of the optimization system described herein, and in particular by means of the additional generators (72a through 72n), which supply additional power for fine adjustment, acting on second switching means (62), the power supplied to the operative inverter (30a through 30n) may be maintained for the maximum number of hours, either in winter or in summer.

In some versions, the assembly of blocks (74a through 74n) of each additional generator (72a through 72n) is designed to supply a power of up to approximately 40% (ignoring losses) of the maximum power acceptable by each inverter (30a through 30n). For example, for the case of using inverters of 100 kW of maximum input power and of solar modules of 175 W, additional generators (72a through 72n) may be used that are each capable of supplying approximately 37.8 kW, consisting of twelve series, or blocks (74a through 74n), of eighteen solar modules (24), each series providing approximately 3.15 kW. Alternatively, any other power levels may be provided by blocks (74a through 74n); and power levels supplied by blocks (74a through 74n) may have any other suitable relationship with the maximum power acceptable by each inverter (30a through 30n).

As the incident irradiation decreases, more series or blocks (74a through 74n) of the additional generators (72a through 72n) may be connected to inverters (30a through 30n) via switching means (62), with the aim of maintaining, according to FIG. 2, a constant power of approximately 100 kW at the common output of a main generator (22a through 22n) and of one additional generator (72a through 72n) during the maximum number of hours.

In the present example, the various blocks (74a through 74n) correspond to various series of solar modules (24) or panels of respective solar trackers or supporting structures, and the main generators (22a through 22n) correspond to groups of solar trackers or supporting structures connected in series and/or parallel. That is, what have previously been called assemblies of photovoltaic panels of the first type refers in this case to these groups (e.g., groups of solar trackers or supporting structures connected in series for main generators (22a through 22n)); and what was called assemblies of photovoltaic panels of the second type refers to these series of solar modules (e.g., solar modules (24) or panels of respective solar trackers or supporting structures of blocks (74a through 74n)). It should therefore be understood that the system of the present example may work with the following two types of switches (among other possible types): Switches of lines (groups of solar trackers) (22a through 22n), when the power to supply to each inverter (30a through 30n) is very high; and switches of series of solar panels (74a through 74n), when a fine adjustment is being made to the optimum power to supply to each inverter (30a through 30n). By means of the switching of the series or blocks (74a through 74n) (e.g., for fine adjustment) then, even at times when there is a decrease in power due to the passage of a simple cloud, the system of the present example may react in real time and may supply more solar power to the inverters (30a through 30n).

Figure 3:
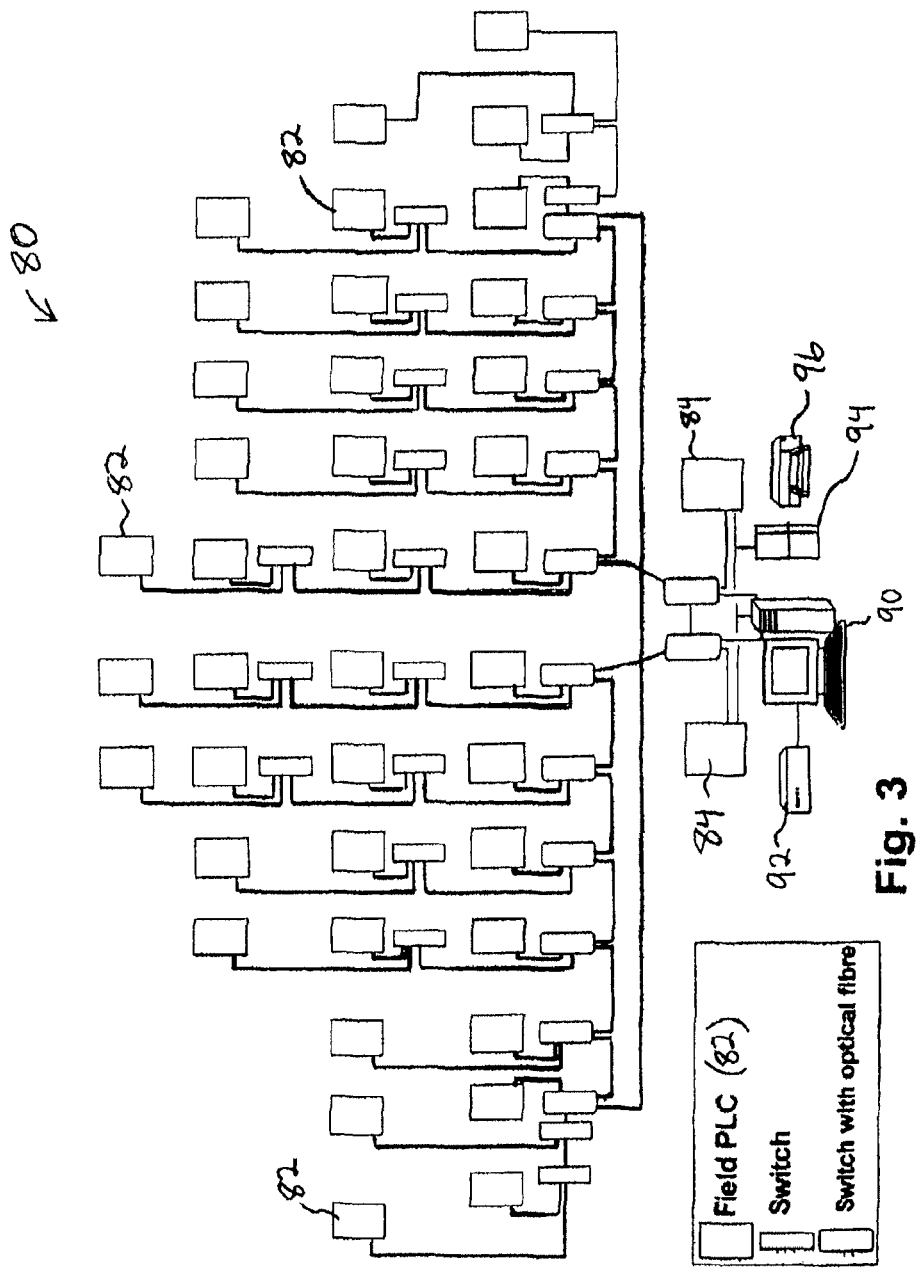
FIG. 3 shows schematically an exemplary control means included in the system of FIG. 2.

In FIG. 3 exemplary control means (80) of the proposed optimization system are illustrated for a version in which a series of field PLCs (82), or slave automata, are included, each of them moving a respective solar tracker (not illustrated) with a specific number of panels grouped in one or various parallel series. The electrical production outputs of all these series may be collected in circuit boards, which are not illustrated, where the currents are detected and the control of additional power, or fine adjustment, is carried out, that is, the switching of blocks (74a through 74n) by acting on the second switching means (62). For this, the measurements of the various series of panels are sent to the nearest field PLC (82), which then proceeds with the control of the additional power, or fine adjustment.

In general, and apart from fine power control, these circuit boards may serve a function of grouping all the electric current that arrives into a single conductor of larger cross-section, which is known as a line, which is distributed to a switching box, where the switching between the main generators (22a through 22n) and the inverters (30a through 30n) (not illustrated in FIG. 3) occurs, acting on the first switching means (60) by the control of one or more master PLCs (84), or master or main automata (two have been illustrated in FIG. 3, though any other suitable number may be used), which collect the data referring to the solar trackers or supporting structures through a communications network consisting of various communication lines (some or all of which may comprise optical fibre), and of various network switches that connect the master PLC (84) with all the field or slave PLCs (82).

In FIG. 3, a PC (86) has also been illustrated, with a series of peripherals (e.g., printer (96), ADSL modem (92), UPS (94), etc.) schematically representing a control SCADA, in which the data for supervision are collected and which controls the master PLCs (84) in order to carry out the control of the switching means (60, 62), according to any suitable versions of the proposed method.

Following the description of FIG. 3, for some versions, the slave PLCs (82) and the master PLC (84) may perform any or all of several functions in real time. For instance, the slave PLCs (82) may perform actuation. In particular, such as in the case of plants with solar trackers of one or two axes, each slave PLC (82) may actuate the movement motors of each tracker so that an optimal position of both azimuth and zenith directions is achieved with a precision of less than approximately 1° to obtain maximum power in the photovoltaic panels of the generators (22a through 22n and/or 72a through 72n). Alternatively, any other level of precision may be used. Slave PLCs (82) may also perform measurement of the currents and voltages of each of the panel series, both of the assembly of panel series making up the base power generators (22a through 22n) and the assembly of panel series making up the fine adjustment power generators (72a through 72n). Slave PLCs (82) may also communicate any or all data measured to the master PLC (84). In addition, slave PLCs (82) may provide actuation of the switching matrix of the blocks (74a through 74n) of the additional generators (72a through 72n) under the request of the master PLC (84), through the second switching means (62). Still other functions that may be performed by a slave PLC (82) will be apparent to those of ordinary skill in the art in view of the teachings herein.

The master PLC (84) may measure and calculate a variety of operational parameters, including but not limited to the following, in real time: the actual instantaneous irradiation; the actual temperature of the plant; the wind speed; and/or the voltage, current, and power parameters of each inverter (30a through 30n). The master PLC (84) may also act on the switching matrix to supply both the base power and the fine adjustment power (e.g., under the demand of the slave PLCs (82)) to the inverter(s) (30a through 30n), determined by a model of maximum efficiency representative of the proposed method. Still other functions that may be performed by a master PLC (84) will be apparent to those of ordinary skill in the art in view of the teachings herein.

In some versions, the control means (80) may also keep in memory data of any or all of the following, among other possible types of data: historical data of annual irradiation to a resolution of one minute or to any other suitable resolution; historical data of annual hourly average temperatures; and/or maximum efficiency curve of the inverters (30a through 30b).

In some versions, the switching means (60 and 62) constitute switching matrices supported by contactors, switchers, relays, breakers and fuses, capable of connecting the lines both of base power, that is that coming from the main generators (22a through 22n), and of fine adjustment or additional power, that is that coming from blocks (74a through 74n) of the additional generators (72a through 72n), to one or several inverters (30a through 30n). Other suitable features and components of switching means (60 and 62) will be apparent to those of ordinary skill in the art in view of the teachings herein. This system of switched power supply can be made as complicated as desired, in general applying the methods described herein, such as to permit each main generator (22a through 22n) to selectively connect to at least two inverters (30a through 30n) and selectively connect/disconnect at least one block (74a through 74n) of additional power. This is the merely illustrative example shown in FIG. 2 and previously described.

The following describes one merely illustrative example of how a photovoltaic plant may be operated in accordance with the teachings herein, though it should be understood that a photovoltaic plant may be operated in a variety of other ways in accordance with the teachings herein.

Before dawn, the control means (80) have connected part of the main generators (22a through 22n), and their associated additional generators (72a through 72n), to only a part of the inverters (30a through 30n), keeping the remainder of the inverters (30a through 30n) disconnected. Supposing a plant of 1 MW formed by ten inverters (30a through 30n) of 100 kW, the system may supply all the anticipated production into only five inverters (30a through 30n), disconnecting the other five inverters (30a through 30n) (e.g., in the case of switching to two inverters (30b and 30d), as illustrated in FIG. 2).

As the day dawns, the various photovoltaic generators or FV (22a through 22n and 72a through 72n), start to supply the generated power to the five selected inverters (30a through 30n) and input currents and voltages of the functioning inverters (30a through 30n) begin to be detected. This situation continues until the total power supplied to each inverter (30a through 30n) reaches the nominal optimum power level for disconnection (which may be different from the nominal optimum power level of the inverter (30a through 30n), which may be specified at around 50% of the load), obtained through the application of mathematical algorithms over the performance curve of the inverter (30a through 30n) and taking into account the number of inverters (30a through 30n) that are involved in the switching. Once this value has been reached, the control means (80) act on the switch matrix, specifically on the first switching means (60), and connect each inverter (30a through 30n) to a main generator (22a through 22n) with the additional one associated generator (72a through 72n), that is, its base power and its fine adjustment power. This process may maintain the inverters (30a through 30n) in the optimum performance range, minimising losses of power due to the performance of the inverter (30a through 30n).

As the day progresses, the production of energy of the FV generators (22a through 22n and 72a through 72n) increases and the system continues detecting the input currents and voltages at the inverters (30a through 30n). When these currents reach approximately 100% of the maximum acceptable value by the inverter (30*a* through 30*n*) or the total power supplied reaches the input limit power accepted by the inverter (30*a* through 30*n*) (or some other threshold), the control means (80) start to sequentially disconnect as many additional generator blocks (74*a* through 74*n*) (of fine adjustment power blocks) as necessary to bring the input currents to the range acceptable by the inverter (30*a* through 30*n*), by means of the control of the second switching means (62).

The previous situation is maintained throughout the hours of maximum solar radiation in such a way that, depending on the actual solar radiation, the temperature and instantaneous cloud cover, the control means (80) connect and disconnect in real time the assembly of fine power adjustment blocks (74*a* through 74*n*) necessary to always maintain approximately the maximum power acceptable by the inverter (30*a* through 30*n*), by controlling the second switching means (62).

When twilight approaches, the cycle inverts and when the power that is being supplied to each inverter (30*a* through 30*n*) reduces below the nominal optimum switching point (or some other threshold), calculated in the same way as the nominal power optimum point for disconnection, the control means (80) change the switching matrix so that the power generated is supplied to one half of the inverters (30*a* through 30*n*) (e.g., in the case of switching to two inverters (30*b* and 30*d*)), disconnecting the inverters (30*a* through 30*n*) that are not working, acting on the first switching means (60).

Although in all the previous description mention is made of the input power for each inverter (30*a* through 30*n*) as a determining factor and referent for carrying out the various selective switching operations, so that each inverter (30*a* through 30*n*) continues operating with high performance and without being damaged, both the systems and the methods described herein may also take as reference the input current of each inverter (30*a* through 30*n*) for the same end, that is, to control the various switching operations, preventing the maximum acceptable input to each inverter (30*a* through 30*n*) from being exceeded, Of course, the selective switching operations described herein may factor in a variety of other reference data, as will be apparent to those of ordinary skill in the art in view of the teachings herein.

By means of versions of the systems and the methods described herein, the incident solar irradiation during the whole year can be utilized with higher efficiency, acquiring major importance especially during the winter and autumn months (fewer hours of sunlight, ice, snow, etc.) and during the possible maintenance tasks carried out on the photovoltaic field FV where some of the generators (22*a* through 22*n* and 72*a* through 72*n*) disconnected from one inverter (30*a* through 30*n*) for its maintenance can be connected to another inverter (30*a* through 30*n*), thereby remaining operative.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A system for energy optimization in photovoltaic generators, the system comprising:
    (a) a plurality of primary photovoltaic generators, each of which comprises a respective assembly of primary photovoltaic panels of a first type and a respective primary output;
    (b) a plurality of supplemental photovoltaic generator systems, wherein each supplemental photovoltaic generator system comprises:
        (i) a plurality of sets of secondary photovoltaic panels of a second type,
        (ii) a supplemental output, and
        (iii) a supplemental switching system operable to selectively couple one or more of the sets of secondary photovoltaic panels with the supplemental output,
        wherein the supplemental output of each supplemental photovoltaic generator system is coupled with a corresponding primary output of the primary photovoltaic generators to form a respective combined output;
    (c) a plurality of inverters configured to convert direct voltage/current into alternating voltage/current, wherein each of the inverters has at least one input;
    (d) a primary switching system arranged between the combined outputs and the inputs of said inverters; and
    (e) a control system, wherein the control system comprises:
        (i) a first logic configured to automatically control said primary switching system to selectively couple or decouple the combined outputs with the inputs of said inverters, and
        (ii) a second logic configured to automatically control said supplemental switching systems to selectively couple or decouple the sets of secondary photovoltaic panels with the corresponding supplemental outputs to supply additional power to the inverters in accordance with the number of sets of secondary photovoltaic panels coupled with the supplemental output of their corresponding supplemental photovoltaic generator system;
    wherein at least a first inverter of the plurality of inverters comprises a first input and a second input, wherein the primary switching system is operable to selectively couple a first one of the combined outputs with the first input of the first inverter and a second one of the combined outputs with the second input of the first inverter.

2. The system of claim 1, wherein each of the sets of secondary photovoltaic panels is arranged to supply approximately between 0.1% and 10% of the maximum power acceptable by each of the inverters.

3. The system of claim 1, wherein each of said primary photovoltaic generators is configured to supply, in conditions of maximum radiation, a maximum output power that is equal to or less than the maximum power acceptable by each of the inverters.

4. The system of claim 1, wherein said control system further comprises at least one processing system configured to carry out said automatic control of said primary and supplemental switching systems depending on values of detected and/or measured operational parameters of the energy optimization system and/or of the assemblies of photovoltaic panels.

5. The system of claim 4, wherein the at least one processing system is further configured to carry out said automatic control of said primary and supplemental switching systems depending on values of calculated operational parameters of the energy optimization system and/or of the assemblies of photovoltaic panels.

6. The system of claim 4, further comprising a series of sensors arranged in different elements of the system and configured to detect values of different operational parameters, wherein the sensors are in communication with said at least one processing system to supply the at least one processing system with said detected values of said different operational parameters.

7. The system of claim 4, wherein said operational parameters include at least one parameter selected from the group consisting of: temperature of a plant including said primary photovoltaic generators and secondary photovoltaic generator systems; temperature of each panels assembly; instantaneous irradiation; wind speed; voltages, currents, and powers of each of the inverters; voltages, currents, and powers of each of the photovoltaic generators and secondary photovoltaic generator systems; voltages, currents, and powers of each of the sets of secondary photovoltaic panels; or a combination thereof.

8. The system of claim 4, further comprising a storage medium having historical data about operational parameters of the system, wherein said at least one processing system is in communication with the storage medium, wherein the at least one processing system is further configured to carry out said automatic control of said primary and supplemental switching systems also depending on said historical data.

9. The system of claim 8, wherein said historical data includes at least one historical data type selected from the group consisting of: annual irradiation curves at a resolution of one minute, annual hourly average temperatures and curves of maximum efficiency of each of the inverters, or a combination thereof.

10. The system of claim 1, wherein none of the sets of secondary photovoltaic panels is coupled with the supplemental output in at least one of the supplemental photovoltaic generator systems, such that the corresponding primary photovoltaic generator serves as the sole source of power for the corresponding combined output.

11. A method for energy optimization in photovoltaic generators, the method comprising:
(a) providing one or more primary photovoltaic generators, wherein each primary photovoltaic generator comprises an output and a respective assembly of photovoltaic panels of a first type;
(b) providing one or more supplemental photovoltaic generator systems, wherein each supplemental photovoltaic generator system comprises:
  (i) a plurality of sets of secondary photovoltaic panels of a second type, and
  (ii) a supplemental output configured to selectively receive power from one or more of the sets of secondary photovoltaic panels,
  wherein the supplemental output of each supplemental photovoltaic generator system is coupled with a corresponding primary output of the primary photovoltaic generators to form a respective combined output;
(c) providing a plurality of inverters, wherein each of the inverters has at least one input and a maximum input power, wherein each of the inverters is configured to convert direct voltage/current into alternating voltage/current, wherein the plurality of inverters includes a selected inverter having a first input and a second input;
(d) connecting a first one of the combined outputs to the first input of the selected inverter to supply the selected inverter with base power;
(e) providing a fine adjustment of power supplied to the selected inverter, wherein the act of providing a fine adjustment comprises connecting one or more of the sets of secondary photovoltaic panels with the corresponding supplemental output to increase power to the corresponding combined output, to thereby supply the selected inverter with additional power without reaching the maximum input power; and
(f) connecting a second one of the combined outputs to the second input of the selected inverter;
wherein the act of connecting one or more of the sets of secondary photovoltaic panels with the supplemental output is performed after the act of connecting the first one of the combined outputs to the first input of the selected inverter.

12. The method of claim 11, further comprising one or both of:
(a) disconnecting one or more of said sets of secondary photovoltaic panels from the supplemental output; or
(b) disconnecting the first or second combined output from the respective first or second input of said selected inverter.

13. The method of claim 11, wherein the act of providing a fine adjustment of power supplied to the selected inverter is performed based at least in part on at least one of:
(i) values of operational parameters of the one or more primary photovoltaic generators,
(ii) values of operational parameters of the one or more supplemental photovoltaic generator systems, or
(iii) values of operational parameters of said assemblies of photovoltaic panels;
said values being detected and/or measured and/or calculated, and/or depending on real historical data about said operational parameters and/or on theoretical data about forecasts of functioning and/or of environmental conditions.

14. The method of claim 13, further comprising pre-establishing a series of theoretical set points relating a theoretical power to supply, to be obtained by a specific number of the one or more primary photovoltaic generators and supplemental photovoltaic generator systems, to be connected to each of the inverters depending on theoretical radiation forecast data for the area where the photovoltaic generators are installed and on real historical data measured beforehand.

15. The method of claim 14, wherein the theoretical set points are pre-established also depending on said detected and/or measured and/or calculated operational parameters.

16. The method of claim 14, further comprising classifying said set points into selected ones of the following situational cases based at least in part on said theoretical data, historical data, and/or operational parameters: dawn, twilight, cloud cover, wind or snow, morning mist, low radiation, and maintenance tasks.

17. The method of claim 14, further comprising:
(a) detecting a real approximation to one of said set points, wherein the real approximation to one of said set points is associated with the one or more primary photovoltaic generators or the one or more supplemental photovoltaic generator systems; and
(b) connecting the one or more primary photovoltaic generators or the one or more supplemental photovoltaic generator systems associated with the one of said set points to at least one of the inverters to supply the at least one of the inverters with power, wherein the theoretical value of the power is given by the one of said set points.

18. The method of claim 14, further comprising compensating for differences between real power being supplied to each of the inverters and the theoretical power relating to an applied set point of the theoretical set points, by connecting or disconnecting one or more of the sets of secondary photovoltaic panels.

19. A system for energy optimization in photovoltaic generators, the system comprising:
(a) a plurality of primary photovoltaic generators, wherein each primary photovoltaic generator comprises:
 (i) a set of primary photovoltaic panels, and
 (ii) a primary output;
(b) a plurality of supplemental photovoltaic generator systems, wherein each supplemental photovoltaic generator system comprises:
 (i) a plurality of sets of secondary photovoltaic panels,
 (ii) a supplemental output, and
 (iii) a supplemental switching system operable to selectively couple one or more of the sets of secondary photovoltaic panels with the supplemental output,
 wherein the supplemental output of each supplemental photovoltaic generator system is coupled with a corresponding primary output of the primary photovoltaic generators to form a respective combined output;
(c) a plurality of inverters, wherein each of the inverters has at least one input;
(d) a primary switching system operable to selectively couple the combined outputs with the inputs of said inverters; and
(e) a control system, wherein the control system comprises:
 (i) a first logic configured to automatically control said primary switching system to selectively couple or decouple the combined outputs with the inputs of said inverters, and
 (ii) a second logic configured to automatically control said supplemental switching systems to selectively couple or decouple the sets of secondary photovoltaic panels with the corresponding supplemental outputs to supply additional power to the inverters in accordance with the number of sets of secondary photovoltaic panels coupled with the supplemental output of their corresponding supplemental photovoltaic generator system
wherein at least a first inverter of the plurality of inverters comprises a first input and a second input, wherein the primary switching system is operable to selectively couple a first one of the combined outputs with the first input of the first inverter and a second one of the combined outputs with the second input of the first inverter.

* * * * *